United States Patent
Sakamoto et al.

(10) Patent No.: US 6,686,041 B2
(45) Date of Patent: Feb. 3, 2004

(54) COLORING MASTER PELLET FOR OPTICAL MOLDED ARTICLE AND COLORED OPTICAL DISK SUBSTRATE

(75) Inventors: Akihiro Sakamoto, Chiyoda-ku (JP); Hideo Ninomiya, Chiyoda-ku (JP); Hisayoshi Shimizu, Chiyoda-ku (JP)

(73) Assignee: Teijin Chemicals Ltd, Tokyo (JP)

( * ) Notice: Subject to any disclaimer, the term of this patent is extended or adjusted under 35 U.S.C. 154(b) by 29 days.

(21) Appl. No.: 10/019,073

(22) PCT Filed: Apr. 27, 2001

(86) PCT No.: PCT/JP01/03731
§ 371 (c)(1),
(2), (4) Date: Dec. 26, 2001

(87) PCT Pub. No.: WO01/83595
PCT Pub. Date: Nov. 8, 2001

(65) Prior Publication Data
US 2003/0124351 A1 Jul. 3, 2003

(30) Foreign Application Priority Data

| Apr. 28, 2000 | (JP) | ........................ 2000-130019 |
| Apr. 28, 2000 | (JP) | ........................ 2000-130022 |
| Apr. 28, 2000 | (JP) | ........................ 2000-130024 |
| Apr. 28, 2000 | (JP) | ........................ 2000-130027 |

(51) Int. Cl.$^7$ ................................ B32B 5/16
(52) U.S. Cl. .................. 428/402; 428/644; 428/647; 428/648; 428/407
(58) Field of Search ...................... 428/402, 407, 428/642, 644, 647, 648

(56) References Cited

U.S. PATENT DOCUMENTS

| 3,669,922 | A | * | 6/1972 | Bartsch et al. |
| 3,871,629 | A | * | 3/1975 | Hishida |
| 4,731,400 | A | | 3/1988 | Shigemoto ............... 524/88 |
| 5,041,259 | A | * | 8/1991 | Fujii et al. |
| 5,116,547 | A | | 5/1992 | Tsukahara et al. ........... 264/1.1 |
| 5,604,279 | A | * | 2/1997 | Bernhardt et al. |
| 5,662,963 | A | * | 9/1997 | Hishida |
| 5,723,517 | A | * | 3/1998 | Campo et al. |
| 5,840,395 | A | | 11/1998 | Sawada et al. ............ 428/64.1 |
| 6,153,670 | A | * | 11/2000 | Skelhorn |
| 6,245,405 | B1 | | 6/2001 | Kawano .................... 428/64.1 |
| 6,475,589 | B1 | * | 11/2002 | Pai-Paranjape et al. |
| 6,566,432 | B2 | * | 5/2003 | Kawamura et al. |

FOREIGN PATENT DOCUMENTS

| JP | 63-003021 | 1/1988 | ........... C08G/63/62 |
| JP | 01-102505 | 4/1989 | ........... G02B/5/22 |
| JP | 02-033742 | 2/1990 | ........... G11B/7/24 |
| JP | 03-062828 A | 3/1991 | ........... C08J/3/20 |
| JP | 05-505635 W | 8/1993 | ........... C08J/3/22 |
| JP | 06-145490 | 5/1994 | ........... C08L/69/00 |
| JP | 07-262606 | 10/1995 | ........... G11B/7/24 |
| JP | 08-124212 A | 5/1996 | ........... G11B/7/24 |
| JP | 10-001572 | 1/1998 | ........... C08L/23/10 |
| JP | 11-342510 A | 12/1999 | ........... B29B/9/12 |
| JP | 2000-273185 | 10/2000 | ........... C08J/3/12 |
| JP | 2000-302953 | 10/2000 | ........... C08L/67/02 |
| JP | 2000-344897 | 12/2000 | ........... C08J/3/22 |

* cited by examiner

Primary Examiner—H. Thi Le
(74) Attorney, Agent, or Firm—Sherman & Shalloway

(57) ABSTRACT

Coloring master pellets for an optical molded article which are formed from a coloring composition, comprising a transparent thermoplastic resin (component A) containing a colorant (component B), wherein the proportion of pellets having colorant concentrations which satisfy a range of 0.5X to 1.5X when the concentrations of the colorants in the pellets are indicated in terms of absorbance and the average concentration is expressed as X is at least 90%.

The coloring master pellets of the present invention have extremely small variations in the concentrations of colorants contained in the pellets. These master pellets are suitably used for obtaining an optical molded article such as an optical disk which has extremely few occurrences of color non-uniformity and color streaks and excellent electric properties.

25 Claims, No Drawings

US 6,686,041 B2

COLORING MASTER PELLET FOR OPTICAL MOLDED ARTICLE AND COLORED OPTICAL DISK SUBSTRATE

TECHNICAL FIELD

The present invention relates to coloring master pellets for obtaining a colored optical molded article. More specifically, it relates to coloring master pellets for obtaining a colored optical molded article which has an excellent design and whose kind and application can be recognized instantaneously. That is, the present invention relates to coloring master pellets which can provide a colored optical molded article having little fading phenomenon, color non-uniformity and color streaks as well as excellent electric properties (such as writability and readability of information).

In the present specification, "coloring master pellets" indicate colorant-containing pellets which are mixed with transparent (colorant-free) pellets and melt-molded to give a colored optical molded article. Therefore, the coloring master pellets are not used for obtaining a colored optical molded article by melt-molding the coloring master pellets alone. Further, "coloring master composition" refers to a colorant-containing resin composition used for forming the coloring master pellets.

In addition, "full coloring pellets" refer to colorant-containing pellets used for obtaining a colored optical molded article by melt-molding the pellets themselves (or melt-molding the pellets without transparent pellets).

BACKGROUND ART

Heretofore, as a method for coloring an optical recording medium by use of the full coloring pellets, an orange optical recording medium comprising a specific dye has been proposed in Japanese Patent Laid-Open Publication No. 1-102505 and black optical recording media have been proposed in Japanese Patent Laid-Open Publication Nos. 2-33742 and 8-124212. Further, an optical disk colored by use of an extremely low concentration of coloring master pellets has been proposed in Japanese Patent Laid-Open Publication No. 7-262606. The terms "extremely low concentration" as used herein mean that the content of a colorant is extremely low.

Meanwhile, a method for inhibiting the generation of silver streaks at the time of producing an optical disk by controlling the amount of fine powders in pellets is disclosed in Japanese Patent Publication No. 6-18890. Further, it is disclosed in Japanese Patent Laid-Open Publication No. 11-342510 that an optical disk using pellets having a low content of fine powders has good electric properties.

However, coloring master pellets for obtaining an optical molded article which have relatively high coloring concentration are subjected to larger influences of the separation of the coloring pellets and the fine powders than the transparent pellets, the full coloring pellets and the extremely low concentration of coloring master pellets and have caused the new problem that when the coloring master pellets are mixed with the transparent pellets to mold an optical molded article such as an optical disk, the optical molded article undergoes a fading phenomenon, has color non-uniformity and color streaks and undergoes a deterioration in its electric properties.

Meanwhile, the transparent pellets, full coloring pellets and extremely low concentration of coloring master pellets disclosed in the above publications are not satisfactory for solving the above problem pertaining to the coloring master pellets.

PROBLEM TO BE SOLVED BY THE INVENTION

The present invention relates to coloring master pellets capable of providing a colored optical molded article such as a colored optical disk substrate which has an excellent design, whose kind and application can be recognized instantaneously and which has little fading phenomenon, color non-uniformity and color streaks as well as good electric properties. It is particularly an object of the present invention to provide coloring master pellets suitable for obtaining an optical disk from which information signals are optically read by means of a laser beam. The present inventors have made intensive studies to achieve the object. As a result, they have found that coloring master pellets which satisfy particular requirements can achieve the object of the present invention and have completed the present invention based on the finding.

That is, the present inventors have studied what causes color non-uniformity and color streaks and what causes a decrease in the reliability of reading and writing information signals when the coloring master pellets are mixed with the transparent pellets and melt-molded into an optical molded article. As a result, they have found that variations among the concentrations of colorant of each pellet in the coloring master pellets are one of the causes and that a colored optical molded article having the occurrence of the color non-uniformity and the color streaks extremely suppressed and the reliability of reading and writing the information signals maintained at a high level can be obtained by reducing the variations among the concentrations to a certain level or lower.

Further, according to the studies of the present inventors, it has been found that when the obtained coloring master pellets having the variations among the concentrations of the colorants in the pellets reduced to a certain level or lower satisfy either of the following requirements (1) and (2), the pellets have extremely excellent properties for obtaining a colored optical molded article, particularly a colored optical disk substrate.

(1) The content of powders whose particle diameters are smaller than the desired shapes of the pellets by at most 2.0 mm, particularly at most 1.0 mm is equal to or lower than a certain content.

(2) The number of foreign materials contained in the pellets is small.

MEANS FOR SOLVING THE PROBLEMS

The present invention has been completed by the above finding. According to the present invention, there are provided coloring master pellets for an optical molded article which are formed from a coloring composition comprising a transparent thermoplastic resin (component A) containing a colorant (component B), wherein the proportion of pellets having colorant concentrations which satisfy a range of 0.5X to 1.5X when the concentrations of the colorants in the pellets are indicated in terms of absorbance and the average concentration is expressed as X is at least 90%.

The optical molded articles in the present invention include a lens, an optical card, an optical fiber and an optical disk, and the optical disk is particularly suitable. The optical disk is a so-called optical disk which information is written on and read from by irradiation of a laser beam. Specific examples thereof include a variety of read-only disks, recordable disks, magneto-optical disks and phase change disks such as a digital audio disk (so-called compact disk: CD), CD-ROM, optical video disk (so-called laser disk), DVD-ROM, digital video disk (DVD-video), DVD-R, CD-R, MO, MD-MO, PD and DVD-RAM. The coloring master pellets of the present invention are useful and suitable particularly for the production of a digital versatile disk which is a high-density optical disk typified by the DVD-ROM, DVD-video, DVD-R, DVD-RAM or the like. Further, the coloring master pellets of the present invention are the most suitable for use in the CD-R and DVD-R.

As the thermoplastic resin which is the component A in the present invention, a thermoplastic resin selected from an aromatic polycarbonate resin, an amorphous polyolefin resin, an acrylic resin, a hydrogenated polystyrene resin, an amorphous polyester resin, an amorphous polyarylate resin and the like is preferably used. The aromatic polycarbonate resin or the amorphous polyolefin resin is more preferable. Illustrative examples of the amorphous polyolefin resin include the APO resin manufactured by Mitsui Chemicals, Inc.; ARTON manufactured by JSR Corporation; Zeonex and Zeonor manufactured by ZEON CORPORATION; and the HPS resin manufactured by Dow Chemical Company. The aromatic polycarbonate resin is particularly preferred.

The details of the aromatic polycarbonate resin suitable as the component A of the present invention will be described hereinafter. The aromatic polycarbonate resin used in the present invention may be the one which is generally obtained by reacting a dihydric phenol with a carbonate precursor by an interfacial polycondensation method or melt transesterification method, the one obtained by polymerizing a carbonate prepolymer by a solid phase transesterification method or the one obtained by polymerizing a cyclic carbonate compound by a ring-opening polymerization method.

Illustrative examples of the dihydric phenol used in the above process include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (commonly referred to as "bisphenol A"), 2,2-bis{(4-hydroxy-3-methyl)phenyl}propane, 2,2-bis{(4-hydroxy-3,5-dimethyl)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenylsulfone, 4,4'-dihydroxydiphenylsulfoxide, 4,4'-dihydroxydiphenylsulfide, 4,4'-dihydroxydiphenylketone, 4,4'-dihydroxydiphenyl ether, and 4,4'-dihydroxydiphenyl ester. These can be used solely or in admixture of two or more.

Of these, a homopolymer or copolymer obtained from at least one bisphenol selected from the group consisting of bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α,α'-bis(4-hydroxyphenyl)-m-diisopropylbenzene is preferred, and a homopolymer of bisphenol A and a copolymer of 1,1-bis(4-hydroxyphenyl)-3,3,5-trimethylcyclohexane, with bisphenol A 2,2-bis{(4-hydroxy-3-methyl)phenyl}propane or α,α'-bis(4-hydroxyphenyl)-m-diisopropylbenzene are particularly preferably used. The homopolymer of bisphenol A or a copolymer of 1,1-bis(4-hydroxyphenyl)-3,3,5-trimethylcyclohexane with α,α'-bis(4-hydroxyphenyl)-m-diisopropylbenzene is particularly preferred.

As the carbonate precursor, a carbonyl halide, a carbonate ester, a haloformate or the like is used. Specific examples thereof include phosgene, diphenyl carbonate and dihaloformate of a dihydric phenol.

When the polycarbonate resin is produced by reacting the dihydric phenol with the carbonate precursor by the interfacial polycondensation method or melt transesterification method, a catalyst, a terminal blocking agent, an antioxidant for the dihydric phenol, and the like may be used as required. Further, the polycarbonate resin may be a branching polycarbonate resin copolymerized with a multifunctional aromatic compound having at least three functional groups, a polyester carbonate resin copolymerized with an aromatic or aliphatic difunctional carboxylic acid or a mixture of two or more of the obtained polycarbonate resins.

Illustrative examples of the multifunctional aromatic compound having at least three functional groups include phloroglucin, phloroglucide, trisphenols such as 4,6-dimethyl-2,4,6-tris(4-hydroxydiphenyl)heptene-2, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol or 4-{4-[1,1-bis(4-hydroxyphenyl)ethyl]benzene}-α,α-dimethyl benzylphenol, tetra(4-hydroxyphenyl)methane, bis(2,4-dihydroxyphenyl)ketone, 1,4-bis(4,4'-dihydroxytriphenylmethyl)benzene, trimellitic acid, pyromellitic acid, benzophenone tetracarboxylic acid, and acid chlorides thereof. Of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

When the multifunctional compound which produces the branching polycarbonate resin is contained, the proportion of the compound is 0.001 to 1 mol %, preferably 0.005 to 0.5 mol %, particularly preferably 0.01 to 0.3 mol % based on the total amount of the aromatic polycarbonate. Further, in the case of the melt transesterification method in particular, a branching structure may be produced as a side reaction. The proportion of the branching structure is also 0.001 to 1 mol %, preferably 0.005 to 0.5 mol %, particularly preferably 0.01 to 0.3 mol % based on the total amount of the aromatic polycarbonate. The proportions can be determined by 1H-NMR measurement.

The reaction by the interfacial polycondensation method is generally a reaction which is carried out between a dihydric phenol and phosgene in the presence of an acid bonding agent and an organic solvent. As the acid bonding agent, an alkali metal hydroxide such as sodium hydroxide or potassium hydroxide or an amine compound such as pyridine is used. As the organic solvent, a halogenated hydrocarbon such as methylene chloride or chlorobenzene is used. Further, to accelerate the reaction, a tertiary amine, quaternary ammonium compound or quaternary phosphonium compound such as triethyl amine, tetra-n-butylammonium bromide and tetra-n-butylphosphonium bromide can be used as a catalyst. In that case, preferably, the reaction temperature is generally 0 to 40° C., the reaction time is about 10 minutes to 5 hours, and the pH during the reaction is kept at 9 or higher.

Further, in the polymerization reaction, a terminal blocking agent is generally used. As the terminal blocking agent, a monofunctional phenol can be used. The monofunctional phenol is generally used as a terminal blocking agent to modify a molecular weight. In addition, since the obtained polycarbonate resin has its terminals blocked by the groups based on the monofunctional phenol, it has excellent thermal stability as compared with a polycarbonate resin whose terminals are not blocked by such groups. As the monofunctional phenol, a monofunctional phenol represented by the following general formula (1) which is generally a phenol or a lower alkyl-substituted phenol can be presented.

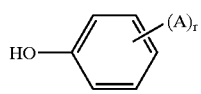
(1)

(In the above formula, A is a hydrogen atom or a linear or branched alkyl group or phenyl group-substituted alkyl group having 1 to 9 carbon atoms, and r is an integer of 1 to 5, preferably 1 to 3.)

Specific examples of the above monofunctional phenol include phenol, p-tert-butylphenol, p-cumylphenol and isooctylphenol.

In addition, as other monofunctional phenols, phenols having a long-chain alkyl group or aliphatic polyester group as a substituent, benzoic acid chlorides and long-chain alkylcarboxylic acid chlorides can be presented. Of these, phenols having the long-chain alkyl groups represented by the following general formulae (2) and (3) as substituents are preferably used.

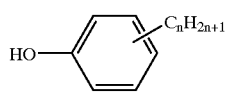
(2)

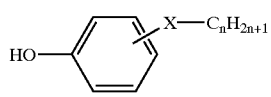
(3)

(In the above formula, X is —R—CO—O— or —R—O—CO— wherein R is a single bond or a bivalent aliphatic hydrocarbon group having 1 to 10 carbon atoms, preferably 1 to 5 carbon atoms, and n represents an integer of 10 to 50.)

As the substituted phenol of the general formula (2), the one with n being 10 to 30 is preferred, and the one with n being 10 to 26 is particularly preferred. Specific examples thereof include decylphenol, dodecylphenol, tetradecylphenol, hexadecylphenol, octadecylphenol, eicosylphenol, docosylphenol and triacontylphenol.

Further, as the substituted phenol of the general formula (3), a compound with X being —R—CO—O— and R being a single bond is appropriate, and the one with n being 10 to 30 is suitable and the one with n being 10 to 26 is particularly suitable. Specific examples thereof include decyl hydroxybenzoic acid, dodecyl hydroxybenzoic acid, tetradecyl hydroxybenzoic acid, hexadecyl hydroxybenzoic acid, eicosyl hydroxybenzoic acid, docosyl hydroxybenzoic acid, and triacontyl hydroxybenzoic acid.

The terminal blocking agent is desirably introduced to at least 5 mol %, preferably at least 10 mol % of terminals based on all terminals of the obtained polycarbonate resin. More preferably, the terminal blocking agent is introduced to at least 80 mol % of terminals based on all terminals, that is, the proportion of the terminal hydroxyl groups (OH groups) derived from the dihydric phenol is 20 mol % or lower. Particularly preferably, the terminal blocking agent is introduced to at least 90 mol % of terminals based on all terminals, that is, the proportion of the OH groups is 10 mol % or lower. Further, the terminal blocking agents may be used solely or in admixture of two or more.

The reaction by the melt transesterification method is generally a transesterification reaction between a dihydric phenol and a carbonate ester and is carried out by a method comprising mixing the dihydric phenol and the carbonate ester together under heating in the presence of an inert gas and distilling out the produced alcohol or phenol. Although the reaction temperature varies depending on the boiling point or the like of the produced alcohol or phenol, it is generally 120 to 350° C. The pressure of the system is reduced to around $1.33 \times 10^3$ to 13.3 Pa in the latter stage of the reaction to facilitate distilling out the produced alcohol or phenol. The reaction time is generally about 1 to 4 hours.

Illustrative examples of the carbonate ester include esters of an aryl group and aralkyl group having 6 to 10 carbon atoms and an alkyl group having 1 to 4 carbon atoms. These groups may be substituted. Specific examples of the carbonate ester include diphenyl carbonate, bis(chlorophenyl) carbonate, dinaphthyl carbonate, bis(diphenyl)carbonate, dimethyl carbonate, diethyl carbonate and dibutyl carbonate. Of these, diphenyl carbonate is preferred.

Further, a polymerization catalyst can be used to accelerate the rate of polymerization. As the polymerization catalyst, catalysts which are generally used in esterification and transesterification, as exemplified by alkali metal compounds such as sodium hydroxide, potassium hydroxide and sodium salts and potassium salts of dihydric phenols; alkaline earth metal compounds such as calcium hydroxide, barium hydroxide and magnesium hydroxide; nitrogen-containing basic compounds such as tetramethylammonium hydroxide, tetraethylammonium hydroxide, trimethylamine and triethylamine; alkoxides of alkali metals and alkaline earth metals; organic acid salts of alkali metals and alkaline earth metals; zinc compounds; boron compounds; aluminum compounds; silicon compounds; germanium compounds; organotin compounds; lead compounds; osmium compounds; antimony compounds; manganese compounds; titanium compounds; and zirconium compounds can be used. These catalysts may be used solely or in combination of two or more. These polymerization catalysts are used in an amount of preferably $1 \times 10^{-8}$ to $1 \times 10^{-3}$ equivalents, more preferably $1 \times 10^{-7}$ to $5 \times 10^{-4}$ equivalents, per mole of the dihydric phenol used as a raw material.

Further, in the polymerization reaction, to decrease the number of phenolic terminal groups, such a compound as bis(chlorophenyl)carbonate, bis(bromophenyl)carbonate, bis(nitrophenyl)carbonate, bis(phenylphenyl)carbonate, chlorophenylphenylcarbonate, bromophenylphenylcarbonate, nitrophenylphenylcarbonate, phenylphenylcarbonate, methoxycarbonylphenylphenyl-carbonate and ethoxycarbonylphenylphenylcarbonate is preferably added in the latter stage of the polycondensation reaction or after the completion of the polycondensation reaction. Above all, 2-chlorophenylphenylcabonate, 2-methoxycarbonylphenylphenylcarbonate and 2-ethoxycarbonylphenylphenylcarbonate are preferred, and 2-methoxycarbonylphenylphenylcarbonate is particularly preferably used.

Further, a deactivator for neutralizing the activity of the catalyst is preferably used in the polymerization reaction. Specific examples of the activator include, but not limited to, benzenesulfonic acid, p-toluenesulfonic acid, sulfonates such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate; and compounds such as trifluoromethanesulfonic acid, naphthalenesulfonic acid, sulfonated polystyrene, methyl acrylate-sulfonated styrene copolymer, dodecylbenzenesulfonic acid-2-phenyl-2-propyl, dodecylbenzenesulfonic acid-2-phenyl-2-butyl, tetrabutylphosphonium octylsulfonate, tetrabutylphosphonium decylsulfonate, tetrabutylphosphonium benzenesulfonate, tetraethylphosphonium dodecylbenzenesulfonate, tetrabutylphosphonium dodecylbenzenesulfonate, tetrahexylphosphonium dodecylbenzenesulfonate, tetraoctylphosphonium dodecylbenzenesulfonate, decylammonium butyl sulfate, decylammonium decyl sulfate, dodecylammonium methyl sulfate, dodecylammonium ethyl sulfate, dodecylmethylammonium methyl sulfate, dodecyldimethylammonium tetradecyl sulfate, tetradecyldimethylammonium methyl sulfate, tetramethylammonium hexyl sulfate, decyltrimethylammonium hexadecyl sulfate, tetrabutylammonium dodecylbenzyl sulfate, tetraethylammonium dodecylbenzyl sulfate and tetramethylammonium dodecylbenzyl sulfate. These compounds can be used in combination of two or more.

Of these deactivators, phosphonium salts or ammonium salts-based deactivators are preferred. The deactivator is preferably used in an amount of 0.5 to 50 moles per mole of the residual catalyst and used in an amount of 0.01 to 500 ppm, more preferably 0.01 to 300 ppm, particularly preferably 0.01 to 100 ppm on the basis of polycarbonate resin after polymerized.

The molecular weight of the polycarbonate resin is preferably 10,000 to 22,000, more preferably 12,000 to 20,000, much more preferably 13,000 to 18,000, particularly preferably 13,500 to 16,500 in terms of viscosity average molecular weight (M). An aromatic polycarbonate resin having such a viscosity average molecular weight is preferred because it provides sufficient strength as an optical material, exhibits good melt-flowability at the time of molding and is free from mold distortion. Further, such aromatic polycarbonate resins may be used in admixture of two or more. The viscosity average molecular weight in the present invention is determined by inserting the specific viscosity ($\eta_{SP}$) obtained from the solution prepared by dissolving 0.7 g of polycarbonate resin in 100 ml of methylene chloride at 20° C. into the following expression.

$\eta_{SP}/c = [\eta] + 0.45 \times [\eta]^2 c$ (wherein [$\eta$] is intrinsic viscosity)

$[\eta] = 1.23 \times 10^{-4} M^{0.83}$ $c = 0.7$

Further, the component A of the present invention preferably contains a thermal stabilizer, particularly preferably a phosphorus-based stabilizer. As the phosphorus-based stabilizer, a phosphite-based stabilizer, a phosphonite-based stabilizer or a phosphate-based stabilizer can be used.

As the phosphite-based stabilizer in the present invention, a variety of phosphite-based stabilizers can be used. To be more specific, the phosphite-based stabilizer is, for example, a phosphite compound represented by the general formula (4):

(wherein $R^1$ represents hydrogen, an alkyl group having 1 to 20 carbon atoms, an aryl or alkaryl group having 6 to 20 carbon atoms, an aralkyl group having 7 to 30 carbon atoms or halo-, alkylthio-(alkyl group has 1 to 30 carbon atoms) or hydroxy-substituted groups thereof, and the three $R^1$s can be the same as or different from one another or may also be a cyclic structure derived from the dihydric phenol).

Further, a more preferable aspect in the general formula (4) is a phosphite compound represented by the following general formula (5):

(wherein $R^2$ and $R^3$ represent hydrogen, an alkyl group having 1 to 20 carbon atoms, an aryl or alkylaryl group having 6 to 20 carbon atoms or an aralkyl group having 7 to 30 carbon atoms, do not represent hydrogen simultaneously and may be the same as or different from each other).

Further, the phosphite-based stabilizer may also be a phosphite compound represented by the following general formula (6):

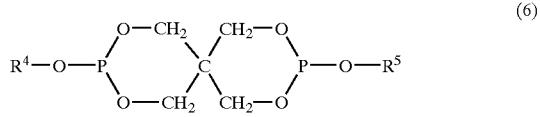

(wherein $R^4$ and $R^5$ each represent hydrogen, an alkyl group having 1 to 20 carbon atoms, an aryl or alkylaryl group having 6 to 20 carbon atoms, an aralkyl group having 7 to 30 carbon atoms, a cycloalkyl group having 4 to 20 carbon atoms or a 2-(4-oxyphenyl)propyl-substituted aryl group having 15 to 25 carbon atoms, and the cycloalkyl group and the aryl group may be or may not be substituted with an alkyl group).

In addition, the phosphite-based stabilizer may also be a phosphonite compound represented by the following general formula (7):

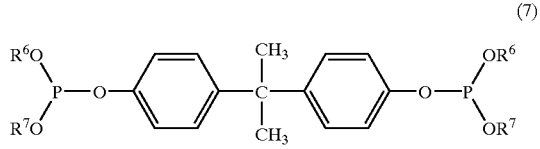

(wherein $R^6$ and $R^7$ represent an alkyl group having 12 to 15 carbon atoms and may be the same as or different from each other).

The phosphonite-based stabilizer may be a phosphonite compound represented by the following general formula (8) or a phosphonite compound represented by the following general formula (9).

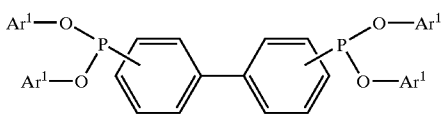

(8)

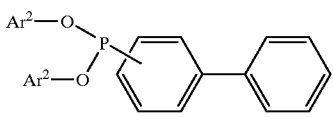

(9)

(wherein $Ar^1$ and $Ar^2$ represent an aryl or alkylaryl group having 6 to 20 carbon atoms or a 2-(4-oxyphenyl)propyl-substituted aryl group having 15 to 25 carbon atoms, the four $Ar^1$s may be the same as or different from one another, and the two $Ar^2$s may be the same as or different from each other).

In the present invention, among the above phosphate compounds and phosphonite compounds, more preferable phosphorus-based stabilizers are the phosphate compound (component E1) represented by the above general formula (5), the phosphonite compound (component E2) represented by the above general formula (8) and the phosphonite compound (component E3) represented by the above general formula (9). These can be used solely or in combination of two or more. It is more preferable to contain the phosphite compound represented by the above general formula (5) in an amount of at least 5 wt % based on 100 wt % of the components E.

Preferable examples of the phosphate compound corresponding to the above general formula (4) include diphenyl isooctyl phosphite, 2,2'-methylenebis(4,6-di-tert-butylphenyl)octyl phosphite, diphenyl mono(tridecyl) phosphite, phenyl diisodecyl phosphate and phenyl di(tridecyl)phosphite. More preferable examples corresponding to the above general formula (5) include triphenyl phosphite, tris(dimethylphenyl)phosphite, tris(diethylphenyl)phosphite, tris(di-iso-propylphenyl) phosphite, tris(di-n-butylphenyl)phosphite, tris(2,4-di-tert-butylphenyl)phosphite and tris(2,6-di-tert-butylphenyl) phosphite. Tris(dialkyl-substituted phenyl)phosphite is preferred, tris(di-tert-butylphenyl)phosphite is more preferred, and tris(2,4-di-tert-butylphenyl)phosphite is particularly preferred. The above phosphite compounds can be used solely or in combination of two or more.

Preferable examples of the phosphate compound corresponding to the above general formula (6) include distearyl pentaerythritol diphosphite, bis(2,4-di-tert-butylphenyl) pentaerythritol diphosphite, bis(2,6-di-tert-butyl-4-methylphenyl)pentaerythritol diphosphite, phenyl bisphenol A pentaerythritol diphosphite and dicyclohexyl pentaerythritol diphosphite. Distearyl pentaerythritol diphosphite, bis (2,4-di-tert-butylphenyl)pentaerythritol diphosphite and bis (2,6-di-tert-butyl-4-methylphenyl)pentaerythritol diphosphite are preferred. The phosphite compounds can be used solely or in combination of two or more.

Preferable examples of the phosphate compound corresponding to the above general formula (7) include 4,4'-isopropylidenediphenol ditridecyl phosphite.

Preferable examples of the phosphonite compound corresponding to the above general formula (8) include tetrakis (2,4-di-iso-propylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-iso-propylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite and tetrakis(2,6-di-tert-butylphenyl)-3,3'-biphenylene diphosphonite. Tetrakis(di-tert-butylphenyl)-biphenylene diphosphonite is preferred, and tetrakis(2,4-di-tert-butylphenyl)-biphenylene diphosphonite is more preferred. This tetrakis (2,4-di-tert-butylphenyl)-biphenylene diphosphonite is preferably a mixture of two or more. To be more specific, although tetrakis(2,4-di-tert-butylphenyl)-4,4'-biphenylene diphosphonite (component E2-1), tetrakis(2,4-di-tert-butylphenyl)-4,3'-biphenylene diphosphonite (component E2-2) and tetrakis(2,4-di-tert-butylphenyl)-3,3'-biphenylene diphosphonite (component E2-3) can be used solely or in combination of two or more as the tetrakis(2,4-di-tert-butylphenyl)-biphenylene diphosphonite, the tetrakis(2,4-di-tert-butylphenyl)-biphenylene diphosphonite is preferably a mixture of all of these three components. Further, in the case of the mixture of the three components, the mixing ratio of the components E2-1, E2-2 and E2-3 is preferably 100:37 to 64:4 to 14, more preferably 100:40 to 60:5 to 11, in terms of weight ratio.

Preferable examples of the phosphonite compound corresponding to the above general formula (9) include bis(2, 4-di-iso-propylphenyl)-4-phenyl-phenyl phosphonite, bis(2, 4-di-n-butylphenyl)-3-phenyl-phenyl phosphonite, bis(2,4-di-tert-butylphenyl)-4-phenyl-phenyl phosphonite, bis(2,4-di-tert-butylphenyl)-3-phenyl-phenyl phosphonite, bis(2,6-di-iso-propylphenyl)-4-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Bis(di-tert-butylphenyl)-phenyl-phenyl phosphonite is preferred, and bis(2,4-di-tert-butylphenyl)-phenyl-phenyl phosphonite is more preferred. This bis(2,4-di-tert-butylphenyl)-phenyl-phenyl phosphonite is preferably a mixture of two or more. To be more specific, although bis(2,4-di-tert-butylphenyl)-4-phenyl-phenyl phosphonite (component E3-1) and bis(2, 4-di-tert-butylphenyl)-3-phenyl-phenyl phosphonite (component E3-2) can be used solely or in combination as the bis(2,4-di-tert-butylphenyl)-phenyl-phenyl phosphonite, the bis(2,4-di-tert-butylphenyl)-phenyl-phenyl phosphonite is preferably a mixture of these two components. Further, in the case of the mixture of the two components, the mixing ratio of the components is preferably 5:1 to 4, more preferably 5:2 to 3, in terms of weight ratio.

Meanwhile, illustrative examples of the phosphate-based stabilizer include tributyl phosphate, trimethyl phosphate, tricresyl phosphate, triphenyl phosphate, trichlorphenyl phosphate, triethyl phosphate, diphenyl cresyl phosphate, diphenyl monoorthoxenyl phosphate, tributoxyethyl phosphate, dibutyl phosphate, dioctyl phosphate and diisopropyl phosphate. Trimethyl phosphate is preferred.

The above thermal stabilizer is contained in an amount of preferably 0.0001 to 0.1 parts by weight, more preferably 0.0005 to 0.05 parts by weight, much more preferably 0.001 to 0.03 parts by weight, based on 100 parts by weight of the component A.

Further, the coloring composition of the present invention may contain a mold releasing agent. Particularly, when the component A is a polycarbonate resin, a higher fatty acid ester is preferably used as the mold releasing agent. The higher fatty acid ester may be esters of an aliphatic saturated monocarboxylic acid having 10 to 34 carbon atoms and a polyhydric alcohol having at least one hydroxyl group. Illustrative examples of the aliphatic saturated monocarboxylic acid include capric acid, undecanoic acid, lauric acid, tridecanoic acid, myristic acid, pentadecanoic acid, palmitic acid, margaric acid, stearic acid, nonadecanoic acid, arachidic acid, behenic acid and montanic acid.

The higher fatty acid ester is more preferably a partial ester of an aliphatic saturated monocarboxylic acid having 10 to 24 carbon atoms, more preferably 16 to 22 carbon atoms and a polyhydric alcohol having at least two hydroxyl groups. DVD must be molded at extremely high temperatures, and the partial ester can inhibit particularly a deterioration in the properties of a fluorescent dye at the time of molding at high temperatures. Illustrative examples of the polyhydric alcohol having at least two hydroxyl groups include ethylene glycol, glycerine and pentaerythritol. A partial ester of stearic acid and glycerine is particularly preferred. The partial ester is commercially available, for example, from Riken Vitamin Co., Ltd. with a trade name "RIKEMAL S-100A" and can be easily obtained from the market. The proportion in the composition of the mold releasing agent is preferably 0.005 to 0.5 parts by weight, more preferably 0.01 to 0.2 parts by weight, based on 100 parts by weight of the component A.

Illustrative examples of the colorant used as the component B of the present invention include organic colorants exemplified by a perylene-based dye, a coumarin-based dye, a thioindigo-based dye, an anthraquinone-based dye, a thioxanthene-based dye, ferrocyanides such as Prussian blue, a perinone-based dye, a quinoline-based dye, a quinacridone-based dye, a dioxazine-based dye, an isoindolenone-based dye and a phthalocyanine-based dye, and carbon black. Of these, transparent organic colorants are preferred. As the colorant used as the component B, the anthraquinone-based dye, perinone-based dye, quinoline-based dye, perylene-based dye, coumarin-based dye and thioindigo-based dye are more preferred.

Specific examples of the dye as the component B include anthraquinone-based dyes known as CI Solvent Red 52, CI Solvent Red 149, CI Solvent Red 150, CI Solvent Red 191, CI Solvent Red 151, CI Solvent Blue 94, CI Solvent Blue 97, CI Solvent Violet 13, CI Solvent Violet 14, CI Solvent Green 3 and CI Solvent Green 28; pyranthrone anthraquinone-based dyes known as CI Vat Orange 9, CI Vat Orange 2 and CI Vat Orange 4; isodibenzanthrone anthraquinone-based dyes; dibenzopyrenequinone anthraquinone-based dyes known as CI Vat Orange 1 and CI Vat Yellow 4. Specific examples of the thioindigo-based dye include CI Vat Red 2, CI Vat Red 41 and CI Vat Red 47. Specific examples of the perylene-based dye include CI Vat Red 15, CI Vat Orange 7 as well as F Orange 240, F Red 305, F Yellow 083 and F Red 339 as LUMOGEN series manufactured by BASF Ltd. Specific examples of the coumarin-based dye include MACROLEX Fluorescent Yellow 10GN (CI Solvent Yellow 160:1) and MACROLEX Fluorescent Red G manufactured by Bayer AG. Specific examples of the quinoline-based dye include CI Solvent Yellow 33, CI Solvent Yellow 157, CI Solvent Yellow 54 and CI Disperse Yellow 160. Specific examples of the perinone-based dye include CI Solvent Red 135, CI Solvent Red 179 and CI Solvent Orange 60. Specific examples of the phthalocyanine-based dye include CI Pigment Blue 15:3, CI Pigment Green 7 and CI Pigment Green 36. These can be used solely or in combination of two or more and can achieve coloration according to purposes.

When the above colorants (dyes) are classified by their colors, i.e., yellow, blue, red and green, specific examples thereof are as follows.

(1) Yellow Dye

Specific examples of yellow dyes include quinoline-based dyes known as CI Solvent Yellow 33, CI Solvent Yellow 157, CI Solvent Yellow 98, CI Disperse Yellow 54 and CI Disperse Yellow 160; a perylene-based dye known as CI Solvent Green 3; a dibenzopyrenequinone anthraquinone-based dye known as CI Vat Yellow 4; a coumarin-based dye known as Solvent Yellow 160:1; and a perylene-based dye known as F Yellow 083 of LUMOGEN series manufactured by BASF Ltd.

Preferable examples thereof are selected from the group consisting of CI Solvent Yellow 33, CI Solvent Yellow 157, CI Solvent Yellow 98, CI Disperse Yellow 54, CI Disperse Yellow 160, CI Solvent Green 5, CI Vat Yellow 4, CI Solvent Yellow 160:1 and F Yellow 083 of LUMOGEN series manufactured by BASF Ltd.

(2) Blue Dye

Specific examples of blue dyes include anthraquinone-based dyes known as CI Solvent Blue 87, CI Solvent Blue 94, CI Solvent Blue 97, CI Solvent Violet 13 and CI Solvent Violet 14: phthalocyanine-based dyes known as CI Pigment Blue 15, CI Pigment Blue 15-1 and CI Pigment Blue 15:3; and CI Disperse Violet 28.

Preferable examples thereof are selected from the group consisting of CI Solvent Blue 87, CI Solvent Blue 94, CI Solvent Blue 97, CI Solvent Violet 13, CI Solvent Violet 14 and CI Disperse Violet 28.

(3) Red Dye

Specific examples of red dyes include anthraquinone-based dyes known as CI Solvent Red 22, CI Solvent Red 52, CI Solvent Red 149, CI Solvent Red 150, CI Solvent Red 151, CI Solvent Red 168, CI Solvent Red 191 and CI Solvent Red 207; pyranthrone anthraquinone-based dyes known as CI Vat Orange 9, CI Vat Orange 2 and CI Vat Orange 4; isodibenzanthrone anthraquinone-based dyes; a dibenzopyrenequinone anthraquinone-based dye known as CI Vat Orange 1; perinone-based dyes known as CI Solvent Red 135, CI Solvent Red 179 and CI Solvent Orange 60; thioindigo-based dyes known as CI Vat Red 2, CI Vat Red 41 and CI Vat Red 47; a coumarin-based dye known as MACROLEX Fluorescent Red G; and perylene-based dyes known as CI Vat Red 15, CI Vat Orange 7 as well as F Orange 240, F Red 305 and F Red 339 of LUMOGEN series manufactured by BASF Ltd.

Preferable examples thereof are selected from the group consisting of CI Solvent Red 22, CI Solvent Red 52, CI Solvent Red 149, CI Solvent Red 150, CI Solvent Red 151, CI Solvent Red 168, CI Solvent Red 191, CI Solvent Red 207, CI Solvent Red 135, CI Solvent Red 179, CI Vat Red 2, CI Vat Red 41, CI Vat Red 47, CI Solvent Orange 55, CI Solvent Orange 60, CI Solvent Orange 63, CI Vat Orange 1, CI Vat Orange 2, CI Vat Orange 4, CI Vat Orange 9, MACROLEX Fluorescent Red G manufactured by Bayer AG and F Red 305, F Red 339 and F Orange 240 of LUMOGEN series manufactured by BASF Ltd.

(4) Green Dye

Specific examples of green dyes include anthraquinone-based dyes known as CI Solvent Green 3, CI Solvent Green 20 and CI Solvent Green 28; and phthalocyanine-based dyes known as CI Pigment Green 7 and CI Pigment Green 36.

Preferable examples thereof are selected from the group consisting of CI Solvent Green 3, CI Solvent Green 20 and CI Solvent Green 28.

To obtain black-colored pellets as the master pellets of the present invention, a green dye and a red dye or a blue dye and a yellow dye are selected from the above dyes and used in combination. That is, a preferable example of such a combination to obtain the black master pellets is a combination of (i) a green dye selected from the group consisting of CI Solvent Green 3, CI Solvent Green 20 and CI Solvent Green 28 and (ii) a red dye selected from the group consisting of CI Solvent Red 22, CI Solvent Red 52, CI Solvent Red 151, CI Solvent Red 168, CI Solvent Red 191, CI Solvent Red 207, CI Solvent Red 135, CI Solvent Red 179 and CI Solvent Orange 60.

Another preferable example to obtain the black master pellets is a combination of (i) a blue dye selected from the group consisting of CI Solvent Blue 87, CI Solvent Blue 94, CI Solvent Blue 97, CI Solvent Violet 13, CI Solvent Violet 14 and CI Disperse Violet 28 and (ii) a yellow dye selected from the group consisting of CI Solvent Yellow 33, CI Solvent Yellow 157, CI Solvent Yellow 98, CI Disperse Yellow 54 and CI Disperse Yellow 160.

The colorant preferably has a small particle diameter, more preferably a particle diameter of not larger than 50 µm, in order to achieve sufficiently uniform dispersion. Such a colorant can be obtained by screening using a variety of filters.

The proportion of the component B in the coloring master pellets of the present invention is preferably 0.005 to 10 wt % based on 100 wt % of the coloring composition. When the proportion of the component B is within the above range, the obtained optical recording medium has satisfactory color saturation, coloration which provides an excellent design can be achieved, and the obtained optical molded article such as an optical disk substrate has good electric properties. The proportion of the component B is more preferably 0.01 to 10 wt %, particularly preferably 0.05 to 5 wt %.

The coloring master pellets of the present invention are not particularly limited in size and shape as long as they are used as coloring master pellets for molding, particularly coloring master pellets for optical molding materials. However, those having a length of 2.0 to 3.3 mm, preferably 2.1 to 3.1 mm, and a long diameter in the cross section of 2.5 to 3.5 mm, preferably 2.7 to 3.3 mm are advantageous. Further, the shape of the cross section may be either circular, oval or rectangular but is desirably circular or oval. When the shape of the cross section is oval, the ratio of the long diameter to the short diameter in the cross section is 1.2 to 1.8, preferably 1.3 to 1.7. The coloring master pellets of the present invention, as will be described later, are mixed with transparent pellets and molded into a colored optical molded article. The shape and size of the transparent pellet are within the ranges described with respect to the shape of the above coloring master pellet. As a preferable aspect in molding the coloring master pellets and the transparent pellets, it is advantageous that the shapes of the coloring master pellets and the transparent pellets are almost the same.

The coloring master pellets of the present invention have extremely small variations in the concentrations of colorants (component B) contained in the pellets. That is, in the case of the coloring master pellets of the present invention, the proportion of pellets which satisfy a range of 0.5X to 1.5X when the concentrations of the colorants in the pellets are indicated in terms of absorbance and the average concentration is expressed as X is at least 90%, preferably at least 95%. The variations in the concentrations are expressed as variations in the absorbances of solutions obtained by dissolving the pellets in solvents as will be described later.

A preferable aspect of the coloring master pellets of the present invention is that the proportion of pellets which satisfy a range of 0.6X to 1.3X, when the concentrations of the colorants in the pellets are indicated in terms of absorbance and the average concentration is expressed as X, is at least 90%, desirably at least 95%.

The most preferable aspect of the coloring master pellets of the present invention is that the proportion of pellets having colorant concentrations which satisfy a range of 0.7X to 1.2x, particularly 0.9X to 1.1x, when the concentrations of the colorants in the pellets are indicated in terms of absorbance and the average concentration is expressed as X is at least 93%, desirably at least 95%.

In addition, the coloring master pellets of the present invention can be produced by a variety of methods such as (1) a method in which a colorant is uniformly mixed with a thermoplastic resin and the mixture is melt-kneaded, (2) a method in which one or a plurality of colorants are added to a resin in high concentrations and dry-blended with the resin by means of a mixer such as a Henschel mixer to obtain a coloring master composition which is then further mixed and melt-kneaded with the rest of the thermoplastic resin, (3) a method in which a colorant is supplied to a melt-kneader such as an extruder independently and melt-kneaded with a resin, (4) a method in which after a colorant is dissolved in an organic solvent, the solution is supplied directly to a molten resin kneader (in this case, the colorant solution is preferably filtered), (5) a method in which the colorant solution of the above (4) is added to a resin in high concentrations to prepare a coloring master composition by means of a mixer such as a Henschel mixer and the prepared coloring master composition is melt-kneaded with the remaining resin component, (6) a method in which the coloring master composition of the above (5) is supplied to a molten resin kneader such as an extruder independently and melt-kneaded, (7) a method in which a colorant solution is mixed with a thermoplastic resin solution (in this case, the solutions are preferably filtered) and the solvent is removed by a spray dryer or the like to obtain powders which are then melt-extruded, and (8) a method in which a mixed solution of a colorant solution and a thermoplastic resin solution is supplied to a melt-kneader such as an extruder directly to obtain the pellets. These methods can be modified as appropriate before use. Further, prior to the use of these methods, a colorant to be used is desirably finely grounded so that it does not contain large particles and separated by use of a sieve when large particles exist. Further, the type and conditions of kneader should be selected so that a colorant can be dispersed in a resin favorably and uniformly when the colorant is mixed and kneaded with the resin.

According to the studies made by the present inventors, an improved version of the above method (2) has been found as an industrially advantageous method for obtaining the target coloring master pellets of the present invention. According to the improved method, colorant powders are uniformly dry-blended with thermoplastic resin powders containing no colorant to obtain a coloring master composition (powder mixture) which is then mixed and melt-kneaded with thermoplastic resin powders or pellets containing no colorant to obtain the target coloring master pellets. This method can provide industrially advantageous coloring master pellets of good quality as compared with the above other methods.

The above improved method is suitable for obtaining coloring master pellets in which the thermoplastic resin (component A) is an aromatic polycarbonate resin. A description will be given to the case where the above improved method is carried out by use of the powders of an aromatic polycarbonate resin (PC) hereinafter. It isoappropriate that polycarbonate resin powders (to be referred to as "PC powders" hereinafter) containing no colorant have an average particle diameter of 0.10 to 0.55 mm, preferably 0.15 to 0.5 mm, particularly preferably 0.25 to 0.40 mm.

As for the mixing ratio of the PC powders to a colorant when they are mixed together to obtain the coloring master composition (powdery), it is appropriate that the proportions of the PC powders and the colorant are 40 to 99.9 wt % and 0.1 to 60 wt %, preferably 60 to 99 wt % and 1 to 40 wt %, particularly preferably 70 to 95 wt % and 5 to 30 wt %, respectively, for example.

The PC powders and the colorant powders are uniformly mixed together in the above proportions to obtain the powdery coloring master composition. The coloring master composition and transparent PC pellets or PC powders are mixed together and melt-formed into the coloring master pellets of the present invention. The terms "transparent PC pellets" as used herein refer to polycarbonate resin pellets containing no colorant.

In this case, such a mixing ratio of the coloring master composition and the transparent PC pellets or PC powders is selected that the proportions of the colorant and the resin in the mixture fall within the ranges defined by the coloring master pellets of the present invention. A suitable mixing ratio of the coloring master composition and the transparent PC pellets or PC powders should be determined in consideration of the content of the colorant in the target coloring master pellets and the content and type of the colorant in the coloring master composition. That is, the coloring master composition and the transparent PC pellets or PC powders are mixed together to obtain the coloring master pellets of the present invention. In this case, the mixing ratio of the coloring master composition to the transparent PC pellets or PC powders is such that the proportions of the former and the latter are desirably 0.5 to 50 wt % and 50 to 99.5 wt %, preferably 1 to 20 wt % and 80 to 99 wt %, particularly preferably 2 to 10 wt % and 90 to 98 wt %. To obtain the optical molded article of the present invention, the mixing ratio of the coloring master pellets to the transparent PC pellets is such that the proportions of the former and the latter are desirably 3 to 50 wt % and 50 to 97 wt %, preferably 5 to 30 wt % and 70 to 95 wt %, particularly preferably 10 to 25 wt % and 75 to 90 wt %.

According to the studies made by the present inventors, it has been found that when an optical molded article such as an optical disk is molded using coloring master pellets containing small chips produced at the time of producing the pellets (mainly at the time of cutting a strand), the molded article has the unique color non-uniformity and color streaks different from merely a silver streak phenomenon and ascribable to the coloring composition and problems with respect to electric properties. Since the size and amount of the pellet chips affect the quality of the optical molded article, the pellet chips are desirably controlled so as not to be contained in an amount higher than a certain amount or removed by means of a sieve or the like.

That is, according to the studies made by the present inventors, coloring master pellets are provided which contain powders formed from the same coloring composition as the coloring master pellets and having a particle diameter of not larger than 2.0 mm in an amount of not larger than 5 wt %, preferably 3 wt %. The terms "particle diameter" of the powder as used herein refer to the length of the long diameter of the longest portion of the powder. The content of the powders having a particle diameter of not larger than 2.0 mm is more preferably not larger than 1 wt %, the most preferably not larger than 0.5 wt %.

It is advantageous that the preferable coloring master pellets of the present invention contain powders having a particle diameter of not larger than 1.0 mm in an amount of not larger than 500 ppm, preferably not larger than 300 ppm, the most preferably not larger than 100 ppm.

It is advantageous that the particularly preferable coloring master pellets of the present invention contain powders having a particle diameter of not larger than 0.5 mm in an amount of not larger than 200 ppm, preferably not larger than 100 ppm, the most preferably not larger than 50 ppm.

The coloring master pellets of the present invention, as described above, can provide an optical molded article having extremely few occurrences of color non-uniformity and color streaks and excellent electric properties by having the variations in the concentrations of colorants in the pellets within a given range, controlling the content of particles formed from the colorant and having a given size in the pellet and controlling the small pellet chips.

One means for producing the coloring master pellets having a low powder content of the present invention is to keep the amount of powders to be produced as small as possible by adjusting the cutting conditions of a strand at the time of producing the pellets. For example, when a resin composition is extruded from an extruder into a strand and the strand is cut into pellets by means of a cutter, the cross section of the pellet desirably has a circular or oval shape and few projections or depressions. To decrease the number of the projections or depressions of the cross section, the cooling of the strand is desirably such that the external surface of the strand is cooled at as uniform a temperature as possible. In that case, the strand is desirably cooled such that the temperature of the strand should be preferably 110 to 140° C., more preferably 120 to 130° C. when cut with the cutter. Thus, the torsion of the strand can be kept as extremely little as possible, and the projections or depressions on the surface of the cross section can be kept as few as possible.

Further, the powders produced at the time of cutting the strand with the cutter can be separated and removed by use of a sieve or a gravity separator using wind power.

As described above, the coloring master pellets of the present invention can be obtained by the most common method in which the melt-extruded strand is cut. Therefore, the shape of the strand is basically cylindrical. Although it may have such a shape as a rectangular column, a cylindrical shape allows the strand to be cooled uniformly and inhibit the so-called "miscutting" or "double cutting" by a pelletizer. Therefore, the cylindrical shape is suitable for obtaining pellets having a more uniform shape.

Further, the coloring master pellets of the present invention preferably satisfy the condition that the average number of giant pellet having a length of not smaller than 4 mm is less than one per 20 g of the pellets. The presence of such a giant pellet having a length equal to or larger than a certain value becomes an unstable factor when the giant pellet is caught in screws at the time of molding. Particularly, in the field of optical recording media where a molding cycle is extremely short, such an unstable factor is liable to cause the non-uniform mixing of the resin. Thus, the presence of the giant pellet which is not a problem in the case of ordinary colorless pellets causes such problems as color non-uniformity and non-uniform optical properties in optical resin molded articles such as colored optical recording media.

The average number of giant pellet having a length of not smaller than 4 mm is less than one preferably per 100 g of the pellets, more preferably per 500 g of the pellets.

The length of the pellet can be measured by a variety of methods such as a method in which each of the pellets is caused to pass through an optical sensor or sonic sensor and the length of each pellet is measured based on the data obtained from the sensor and a method in which the pellet is subjected to image-processing to determine its length.

Meanwhile, to reduce the number of giant pellets having a length equal to or larger than a given length to a minimum, the strand must be cut stably. Therefore, the pellets must be produced in consideration of the following points.

(1) Attention is paid to the abrasion of the cutter blades and the clearance between the stationary blade and the rotary blade of a pelletizer to prevent the miscutting caused thereby.
(2) The temperature of the strand is stabilized to cut it with its hardness remaining almost constant so as to prevent miscutting.
(3) A pelletizer equipped with a pull-in roll which rotates at a stable speed and has sufficient torque is used since the strand is pulled in the pelletizer at a constant speed.
(4) The die of an extruder is carefully designed and, in some cases, a gear pump is provided to stabilize the amount of discharge so as to stabilize the thickness of the strand. This is necessary because variations in the thicknesses of the strands cause variations in the crimping forces of the roll to the strands and the variations in the crimping forces vary the pull-in speed of the strands.
(5) The roll and the cutter blades are placed closely to each other so as to prevent the strands from becoming seriously distorted by the shearing forces of the cutter blades. In addition, a problem with respect to costs arises as compared with the above fundamental operations. A method in which the length of each of pellets separated by a separator is detected by an optical sensor or the like and those having a length equal to or larger than a given length are screened can also be used.

The coloring master pellets of the present invention which have a low content of foreign materials having a particular size are suitable for obtaining an optical molded article (such as an optical disk) which does not have polarization deficiency (white defects) in a high temperature and high humidity environment, has few errors in reading recorded data and is highly reliable.

The terms "foreign materials" as used in the present invention refer to any contaminants mixed in any step between the production of the thermoplastic resin (such as an aromatic polycarbonate resin) from raw materials and the molding of the optical molded article and include all components insoluble in methylene chloride, such as the impurities and dust contained in the raw materials to be used (such as monomers, solvents, additives including a stabilizer and a mold releasing agent, and colorants), the dust adhered to production facilities and the carbonized materials produced during the molding process.

The coloring master pellets of the present invention contain at most one foreign material having a particle diameter of not smaller than 200 $\mu$m, preferably at most 300 foreign materials having a particle diameter of not smaller than 100 $\mu$m, more preferably at most 500 foreign materials having a particle diameter of not smaller than 50 $\mu$m, per kg of the pellets. Further, the number of foreign materials having a particle diameter of not smaller than 0.5 $\mu$m is preferably at most 10,000/g in relation to the amount of very small foreign materials.

To obtain a thermoplastic resin containing a small amount of foreign materials, raw materials (such as monomers, solvents, additives including a stabilizer and a mold releasing agent, and colorants) which have been purified by sublimation, recrystallization or the like and have a small amount of impurities are used; a thermoplastic resin is produced by the above conventionally known general method (such as a solution polymerization method or melt polymerization method) and the thermoplastic resin in a solution state is then filtered; or granular raw materials after granulation (removal of solvent) are, for example, rinsed with a poor solvent such as acetone under heated conditions to remove such impurities and foreign materials as low-molecular-weight components and unreacted components. Further, in the extrusion step (pelletization step) in which pellet-shaped resins to be injection-molded are obtained, the resins in a molten state are caused to pass through a sintered metal filter having a filtration accuracy of 10 $\mu$m to remove foreign materials. As required, an additive such as an antioxidant, e.g., a phosphorus-based antioxidant, can be added to inhibit the generation of foreign materials. In any event, the contents of foreign materials, impurities, solvents and the like in the raw material resin to be injection-molded must to be reduced to a minimum.

The coloring master pellets of the present invention are pellets which have extremely small variations in the concentrations of colorants in the pellets. In other words, the coloring master pellets of the present invention are pellets in which colorants are dispersed uniformly and favorably. Further, the coloring master pellets of the present invention have extremely small contents of pellets chips (powders) and foreign materials.

The high-quality coloring master pellets of the present invention can be mixed with transparent thermoplastic resin pellets (to be referred to as "transparent pellets" hereinafter) containing no colorant and melt-molded into a colored optical molded article (such as an optical disk) having few occurrences of color non-uniformity and color streaks and excellent electric properties.

The mixing ratio of the coloring master pellets to the transparent pellets is not particularly limited. A suitable mixing ratio is such that the proportion of the coloring master pellets is 3 to 50 wt %, preferably 5 to 30 wt %, particularly preferably 10 to 25 wt %, and the proportion of the transparent pellets is 97 to 50 wt %, preferably 95 to 70 wt %, particularly preferably 90 to 75 wt %, when the total of the two types of pellets is 100 wt %.

The size and shape of the transparent pellets to be mixed with the coloring master pellets are preferably selected from the same sizes and shapes as those listed above with respect to the coloring master pellets. The most preferable embodiment is that the two types of pellets have almost the same shape and size. Further, the transparent pellets suitably have low contents of pellet chips and foreign materials within the same ranges as those described with respect to the coloring master pellets.

A variety of conventionally known methods can be used as a method for obtaining an optical molded article from the coloring master pellets of the present invention and the transparent pellets. For example, the pellets can be molded into a desired shape by such a method as injection molding, extrusion or compression molding. The present invention is suitable not only for colored optical disks, particularly disk-shaped optical recording media such as a colored CD-R and a colored DVD-R but also for plate-like molded articles such as an optical card. In addition, the present invention is also suitable in a variety of embodiments of laminated recording media having the functions of optical recording media. These optical recording media are suitable for use for a variety of video software, computer software and game software.

In addition, since the coloring master pellets of the present invention have extremely small variations in the concentrations of the colorants as described above, they don't have to be mixed with the transparent pellets to obtain an optical molded article. Illustrative examples of the optical molded article include colored optical disks such as a colored CD-R and a colored DVD-R.

EXAMPLE

The present invention will be descried in detail with reference to examples hereinafter. The present invention, however, shall by no means be limited to these examples. Further, "parts" in the examples indicate "parts by weight" unless otherwise stated. The evaluation items and methods of optical disks are as follows.

(1) Measurement of Color Non-Uniformity

Blend pellets shown in Table 2 were continuous-molded by means of an injection molding machine (S480/150, product of Sumitomo Heavy Industries, Ltd.) at a cylinder temperature of 350° C. and a mold temperature of 120° C. to prepare a hundred molded plates for evaluating color non-uniformity which each have a length of 50 mm, a width of 90 mm and a thickness of 0.6 mm.

These hundred molded plates were measured for the L* (lightness), a* (chromaticity from red to green) and b* (chromaticity from yellow to blue) under a D65 light source (correlated color temperature: 6,504 K) by use of a spectrophotometer (SF500, product of Datacolor, Inc.), their maximum values and minimum values were inserted into the formula (i) to determine a color difference, and the color difference was rated in three levels. The closer the value of ΔE* (color difference) is to 0, the more stable the hue is.
○: ΔE*≦0.5
Δ: 0.5<ΔE*<1.0
×: ΔE*≧1.0

$$\Delta E^* = \sqrt{(L*\max - L*\min)^2 + (a*\max - a*\min)^2 + (b*\max - b*\min)^2} \quad (i)$$

L*max, a*max, b*max: maximum values out of the hundred molded plates
L*min, a*min, b*min: minimum values out of the hundred molded plates (2) Measurement of Color Streaks The appearances of the first shot to the tenth shot of the hundred molded plates for evaluating color non-uniformity were observed visually and rated in three levels.
○: Absolutely no color streaks
Δ: One color streak
×: Two or more color streaks (3) Observation of the Appearance of Optical Disk The appearance of the optical disk obtained above was observed visually.

(4) Measurement of BLER

The following blend pellets were molded into an aluminum-attached substrate having a thickness of 1.2 mm and a diameter of 120 mm by means of an injection molding machine (DISK 3M III, product of Sumitomo Heavy Industries, Ltd.), and the BLER of the substrate was measured by means of a BLER measuring device (CD player control unit CDS-3000, product of SONY Corporation). The C1AVE shown in Table 4 is the average per second of C1 errors (random errors that can be corrected by a C1 code).

(5) Light Transmittance

As a test piece for measuring light transmittance, the obtained pellets were molded into a molded plate for evaluating transmittance which has a length of 50 mm, a width of 90 mm and a thickness of 0.6 mm by means of an injection molding machine (S480/150, product of Sumitomo Heavy Industries, Ltd.) at a cylinder temperature of 350° C. and a mold temperature of 120° C.

The light transmittance of the molded plate was measured by use of the recording spectrophotometer U-3200 of Hitachi, Ltd., and (a) the largest light transmittance at wavelengths of 350 to 400 nm, (b) the smallest light transmittance at wavelengths of 400 to 650 nm and (c) the light transmittance at a wavelength of 650 nm were determined.

(6) Measurement of the Content of Powders

After 5 kg of the coloring master pellets were weighed, the pellets were subjected to a circular sieve shaker (TM-70-2S, Tokujyu Corp.) for 20 minutes to screen powders having a particle diameter of not larger than 2.0 mm, those having a particle diameter of not larger than 1.0 mm and those having a particle diameter of not larger than 0.5 mm. The weights of these powders were measured and expressed in ppm.

(7) Measurement of the Length of the Coloring Master Pellet 500 g of each type of coloring master pellets shown in Table 1 were sampled. Each of the pellets was conveyed on a belt having a semicylindrical grave engraved thereon. The image of the pellet on the belt was taken in the CCD cameras placed above and on the sides of the belt, and the image was analyzed to determine the length and diameter of each pellet. Three CCD cameras were placed, and the average length and diameter of the data recorded by the three cameras were determined as the length and diameter of the pellet.

(8) Measurement of the Content of Foreign Materials

The content of foreign materials having a size of not smaller than 200 μm was measured by dissolving a given amount of the pellets in methylene chloride which had been filtered in advance by a filter having an opening of 0.05 μm, filtering the resulting mixture by a filter having an opening of 200 μm and counting the number of residues on the filter. The number of residues per kg of the resin was displayed.

Further, the content of foreign materials having a size of not smaller than 0.5 μm was measured by passing the above solution through a liquid fine particle counter (product of HIAC-ROYCO Company) based on a light scattering/light blocking system using laser light.

(9) Test for Long-Term Reliability

An optical disk substrate (diameter: 120 mm, thickness: 1.2 mm) molded by a disk molding machine (DISK 3M III, Sumitomo Heavy Industries, Ltd.) was left to stand in a constant-temperature constant-humidity bath adjusted to a temperature of 80° C. and a relative humidity of 85% for 1,000 hours, and the number of white defects (polarization deficiencies) having a size of not smaller than 20 μm in the substrate was counted. This procedure was conducted on 25 optical disk substrates, and the average of the counts was calculated and taken as the number of white spots.

(10) Test for the Lamination of Substrates

A DVD disk was obtained by spin-coating an ultraviolet curable adhesive on data substrates, laminating the substrates together and irradiating ultraviolet radiation to cure the adhesive. Then, the adhesion was evaluated based on the following criteria.
○: The substrates cannot be separated by hands and have sufficient adhesion.
×: The substrates can be separated by hands.

(11) Method for Measuring Absorbance

The coloring master pellets dried at 120° C. for 5 hours were weighed, one pellet (about 20 mg) was sampled from the pellets and measured in a measuring flask, and the pellet was properly diluted (to 100, 200, 300, 500, 1,000 or 1,500 times, for example) with chloroform. The light transmittances at wavelengths of 400 to 700 nm of the solution were measured by uses of a quartz cell having an optical path length of 10 mm and the recording spectrophotometer U-3200 of Hitachi, Ltd. The largest absorption wavelength was defined as λmax. The dilution ratio of chloroform when the light transmittance at the λmax was 35 to 70% was defined as A. A hundred coloring pellets were measured for absorbance at the dilution ratio A in the same manner as described above. For information, the absorbances of the coloring master pellets of Examples N, O, P and Q are as follows.

As a result of measuring the absorbance of the coloring master pellets of Example N at a dilution ratio of 1,500 times and a λmax of 477 nm, it was 0.252 on the average.

As a result of measuring the absorbance of the coloring master pellets of Example O at a dilution ratio of 700 times and a λmax of 478 nm, it was 0.309 on the average.

As a result of measuring the absorbance of the coloring master pellets of Example P at a dilution ratio of 300 times and a λmax of 460 nm, it was 0.387 on the average.

As a result of measuring the absorbance of the coloring master pellets of Example Q at a dilution ratio of 250 times and a λmax of 634 nm, it was 0.195 on the average.

The symbols and items representing the components shown in Table 1 are as follows.

Thermoplastic Resin (Component A)

PC-1

Bisphenol A polycarbonate resin powders (using p-tert-butylphenol as a terminal blocking agent) having a viscosity average molecular weight of 15,200, obtained by a phosgene method using no amine catalyst and having an average particle diameter of 0.33 mm.

PC-2

Aromatic polycarbonate copolymer powders (using p-tert-butylphenol as a terminal blocking agent) having a viscosity average molecular weight of 14,800, obtained by a phosgene method using an amine catalyst and containing 45 mol % of 1,1-bis(4-hydroxyphenyl)-3,3,5-trimethylcyclohexane [bisphenol TMC] and 55 mol % of 4,4'-(m-phenylenediisopropylidene)diphenol[bisphenol M] as all aromatic dihydroxy components.

PC-3

Bisphenol A polycarbonate resin pellets having a concentration of terminal hydroxyl groups of 34 mol % and a viscosity average molecular weight of 15,300 and obtained by a melt transesterification method using $2\times10^{-7}$ moles of the disodium salt of bisphenol A as a transesterification catalyst per mole of bisphenol A as a raw material.

Colorants (Component B)

red dye-1: perinone-based red dye, Plast Red 8370, a product of ARIMOTO CHEMICAL CO., LTD.

red dye-2: perylene-based fluorescent red dye, Lumogen F Red 305, a product of BASF Ltd.

red dye-3: coumarin-based fluorescent red dye, Macrolex Fluorescent Red G, a product of Bayer AG red dye-4: thioindigo-based fluorescent red dye, Plast Red D54, a product of ARIMOTO CHEMICAL CO., LTD.

red dye-5: perinone-based red dye, Kp Plast Red HG, a product of Kiwa Chemical Industry Co., Ltd.

red dye-6: perinone-based red dye, Kp Plast Red H2G, a product of Kiwa Chemical Industry Co., Ltd.

yellow dye-1: quinoline-based yellow dye, Plast Yellow 8010, a product of ARIMOTO CHEMICAL CO., LTD.

yellow dye-2: coumarin-based fluorescent yellow dye, Macrolex Fluorescent Yellow 10GN, a product of Bayer AG yellow dye-3: quinoline-based yellow dye, Plast Yellow 8050, a product of ARIMOTO CHEMICAL CO., LTD.

green dye: anthraquinone-based green dye, Oil Green 5602, a product of ARIMOTO CHEMICAL CO., LTD.

blue dye: anthraquinone-based blue dye, Macrolex Blue RR, a product of Bayer AG

Other Additive Components

ST: tris(2,4-di-tert-butylphenylphosphite), Irgafos 168, a product of Nippon Ciba-Geigy Ltd.

L1: glycerine monostearate, RIKEMAL S-100A, a product of Riken Vitamin Co., Ltd.

Examples A to R and 1 to 25 and Comparative Examples A, B and 1 to 3

<Production of Coloring Mater Pellets and Transparent Pellets>

Coloring master pellets A to R were produced in the following manner. Firstly, the colorant components and additive components shown in Table 1 were diluted with the polycarbonate resin powders as the component A so that the content of the colorant components and additive components should be 10 wt %, and they were mixed uniformly by means of a Henschel mixer to obtain a coloring master composition and an additive master composition. Then, the coloring master composition was mixed with an additional resin component so as to achieve the proportions shown in Table 1 and mixed uniformly by means of a tumbler. Thereafter, the resulting mixture was melt-kneaded and extruded into pellets (pellet size: 2.7 mm in diameter×3.0 mm in length) by a 30-mm-φ twin-screw extruder (KTX-30, product of KOBE STEEL, LTD.) having a vent at a cylinder temperature of 280° C. while the air in the extruder was being evacuated from the vent. A filter was provided at the dice of the extruder so that the pellets should contain 20 or less foreign materials having a size of not smaller than 5 μm per gram. Further, all of the above apparatuses were placed in an atmosphere in which clean, filtered air was circulated under a pressure of 101.8 kPa, and ion exchanged water was used as cooling water.

In addition, in the production of the coloring master pellets A to Q, a method (corrugated board cooling method) in which a strand was passed on a corrugated board on which cooling water flew to be cooled was used as a cooling method, and the temperature of the pellets immediately after the pellets were cut out of the strand by a cutter was 132° C. These pellets were dropped in a rectangular conduit with ionized air blowing against the pellets to remove powders adhered to the pellets.

Coloring master pellets X were produced in the following manner. The colorant components, additive components and thermoplastic resin as the component A shown in Table 1 were mixed directly only by means of a tumbler so as to achieve the proportions shown in Table 1. Thereafter, the resulting mixture was melt-kneaded and extruded into pellets by the 30-mm-φ twin-screw extruder (KTX-30, product of KOBE STEEL, LTD.) having a vent at a cylinder temperature of 280° C. while the air in the extruder was being evacuated from the vent. No filter was provided at the dice of the extruder, and tap water was used as water for cooling the above apparatuses.

Further, in the production of the coloring master pellets X, a method in which a strand was passed through a water bath kept at 27° C. for 5 seconds to be cooled was used as a cooling method, the temperature of the pellets immediately after the pellets were cut out of the strand by a cutter was 83° C., and these pellets were not subjected to the removal of fine powders by ionized air.

In addition, separately from the above pellets, transparent pellets (pellet size: 2.7 mm in diameter×3.0 mm in length) containing no colorant components for dilution were prepared in the same manner as in the above coloring master pellets A to Q.

TABLE 1

| Types of Coloring Master Pellets | | | A | B | C | D | E | F | G | H | I |
|---|---|---|---|---|---|---|---|---|---|---|---|
| Component A | PC-1 | parts by weight | 98.29 | 98.31 | 98.31 | 98.91 | 98.91 | 98.91 | 98.91 | 99.71 | 98.91 |
| | PC-2 | parts by weight | | | | | | | | | |
| | PC-3 | parts by weight | | | | | | | | | |
| Component B | Red Dye-1 | parts by weight | 1 | | | 1 | | | | | |
| | Red Dye-2 | parts by weight | | | | | | | | | |
| | Red Dye-3 | parts by weight | | | | | | | | | |
| | Red Dye-4 | parts by weight | | | | | | | | | |
| | Red Dye-5 | parts by weight | | 1 | | | 1 | | | | |
| | Red Dye-6 | parts by weight | | | 1 | | | 1 | | | |
| | Yellow Dye-1 | parts by weight | 0.02 | | | | | | 1 | | |
| | Yellow Dye-2 | parts by weight | | | | | | | | | |
| | Yellow Dye-3 | parts by weight | | | | | | | | 0.2 | |
| | Green Dye | parts by weight | 0.6 | 0.6 | 0.6 | | | | | | |
| | Blue Dye | parts by weight | | | | | | | | | 1 |
| Other Components | ST | parts by weight | 0.01 | 0.01 | 0.01 | 0.01 | 0.01 | 0.01 | 0.01 | 0.01 | 0.01 |
| | L1 | parts by weight | 0.08 | 0.08 | 0.08 | 0.08 | 0.08 | 0.08 | 0.08 | 0.08 | 0.08 |

| Types of Coloring Master Pellets | | | J | K | L | M | N | O | P | Q | X |
|---|---|---|---|---|---|---|---|---|---|---|---|
| Component A | PC-1 | parts by weight | 98.91 | 99.61 | | 15.39 | 98.44 | 99.41 | 99.86 | 99.81 | 99.81 |
| | PC-2 | parts by weight | | | 98.29 | | | | | | |
| | PC-3 | parts by weight | | | | 82.9 | | | | | |
| Component B | Red Dye-1 | parts by weight | | | 1 | 1 | | | | | |
| | Red Dye-2 | parts by weight | 0.05 | | | | | | | | |
| | Red Dye-3 | parts by weight | 0.1 | | | | | | | | |
| | Red Dye-4 | parts by weight | 0.85 | | | | | | | | |
| | Red Dye-5 | parts by weight | | | | | | | | | |
| | Red Dye-6 | parts by weight | | | | | 0.93 | 0.5 | | | |
| | Yellow Dye-1 | parts by weight | | | 0.02 | 0.02 | | | | | |
| | Yellow Dye-2 | parts by weight | | 0.3 | | | | | | | |
| | Yellow Dye-3 | parts by weight | | | | | | | 0.05 | | |
| | Green Dye | parts by weight | | | 0.6 | 0.6 | 0.54 | | | | |
| | Blue Dye | parts by weight | | | | | | | | 0.1 | 0.1 |
| Other Components | ST | parts by weight | 0.01 | 0.01 | 0.01 | 0.01 | 0.01 | 0.01 | 0.01 | 0.01 | 0.01 |
| | L1 | parts by weight | 0.08 | 0.08 | 0.08 | 0.08 | 0.08 | 0.08 | 0.08 | 0.08 | 0.08 |

TABLE 2

| | | | | Ex. A | Ex. B | Ex. C | Ex. D | Ex. E | Ex. F | Ex. G | Ex. H | Ex. I | Ex. J |
|---|---|---|---|---|---|---|---|---|---|---|---|---|---|
| Molded Pellets | Coloring Master Pellets | Types | — | A | B | C | D | E | F | G | H | I | J |
| | | Amount Blended | parts by weight | 20 | 20 | 20 | 20 | 20 | 20 | 20 | 20 | 20 | 20 |
| | Transparent Pellets | PC-1 | parts by weight | 80 | 80 | 80 | 80 | 80 | 80 | 80 | 80 | 80 | 80 |
| | | PC-2 | parts by weight | | | | | | | | | | |
| | | PC-3 | parts by weight | | | | | | | | | | |
| Properties of Coloring Master Pellets | Variations in Absorbances of Pellets | 0.9X to 1.1X | | 99 | 99 | 98 | 100 | 100 | 100 | 98 | 97 | 98 | 97 |
| | | 0.6X to 1.3X | | 100 | 100 | 100 | 100 | 100 | 100 | 100 | 99 | 100 | 99 |
| | Content of Powders | 0.5X to 1.5X | | 100 | 100 | 100 | 100 | 100 | 100 | 100 | 100 | 100 | 100 |
| | | Out of 0.5X to 1.5X | | — | — | — | — | — | — | — | — | — | — |
| | | Not Larger Than 0.5 mm | ppm | 34 | 35 | 35 | 27 | 28 | 28 | 36 | 36 | 35 | 48 |
| | | Not Larger Than 1.0 mm | ppm | 50 | 55 | 53 | 44 | 44 | 46 | 58 | 58 | 56 | 72 |
| | | Not Larger Than 2.0 mm | % by weight | 0.2 | 0.2 | 0.2 | 0.2 | 0.2 | 0.2 | 0.3 | 0.4 | 0.3 | 0.5 |
| | Number of Pellets having a Length of at least 4 mm | | number/20 g | 0 | 0 | 0 | 0 | 0 | 0 | 0 | 0 | 0 | 0 |
| | Average Pellet Length | | mm | 3.0 | 3.0 | 3.0 | 3.0 | 3.0 | 3.0 | 3.0 | 3.0 | 3.0 | 3.0 |
| | Average Pellet Diameter | | mm | 2.7 | 2.7 | 2.7 | 2.7 | 2.7 | 2.7 | 2.7 | 2.7 | 2.7 | 2.7 |
| | Foreign Materials | Not Smaller Than 200 μm | number/kg | 0.5 | 0.5 | 0.5 | 0.4 | 0.4 | 0.4 | 0.4 | 0.4 | 0.4 | 0.4 |
| | | Not Smaller Than 0.5 μm | number/g | 8,200 | 8,000 | 8,100 | 7,400 | 7,200 | 7,300 | 7,300 | 7,400 | 7,400 | 6,900 |

Ex.: Example

TABLE 3

| | | | | Ex. K | Ex. L | Ex. M | Ex. N | Ex. O | Ex. P | Ex. Q | Ex. R | C. Ex. A | C. Ex. B |
|---|---|---|---|---|---|---|---|---|---|---|---|---|---|
| Molded Pellets | Coloring Master Pellets | Types | — | K | L | M | N | O | P | Q | A | X | |
| | | Amount Blended | parts by weight | 20 | 20 | 20 | 20 | 20 | 20 | 20 | 10 | 20 | |
| | Transparent Pellets | PC-1 | parts by weight | 80 | | | 80 | 80 | 80 | 80 | 90 | 80 | 100 |
| | | PC-2 | parts by weight | | 80 | | | | | | | | |
| | | PC-3 | parts by weight | | | 80 | | | | | | | |
| Properties of Coloring Master Pellets | Variations in Absorbances of Pellets | 0.9X to 1.1X | | 96 | 99 | 99 | 99 | 100 | 98 | 98 | 99 | 30 | — |
| | | 0.6X to 1.3X | | 99 | 100 | 100 | 100 | 100 | 100 | 100 | 100 | 61 | — |
| | | 0.5X to 1.5X | | 100 | 100 | 100 | 100 | 100 | 100 | 100 | 100 | 84 | — |
| | | Out of 0.5X to 1.5X | | — | — | — | — | — | — | — | — | 16 | — |
| | Content of Powders | Not Larger Than 0.5 mm | ppm | 45 | 38 | 32 | 34 | 28 | 35 | 35 | 34 | 270 | — |
| | | Not Larger Than 1.0 mm | ppm | 60 | 58 | 50 | 50 | 44 | 58 | 56 | 50 | 440 | — |
| | | Not Larger Than 2.0 mm | % by weight | 0.4 | 0.4 | 0.2 | 0.2 | 0.2 | 0.2 | 0.2 | 0.2 | 6.3 | — |
| | Number of Pellets having a Length of at least 4 mm | | number/20 g | 0 | 0 | 0 | 0 | 0 | 0 | 0 | 0 | 3 | — |
| | Average Pellet Length | | mm | 3.0 | 3.0 | 3.0 | 3.0 | 3.0 | 3.0 | 3.0 | 3.0 | 3.1 | — |
| | Average Pellet Diameter | | mm | 2.7 | 2.7 | 2.7 | 2.7 | 2.7 | 2.7 | 2.7 | 2.7 | 2.7 | — |
| | Foreign Materials | Not Smaller Than 200 μm | number/kg | 0.3 | 0.5 | 0.5 | 0.5 | 0.4 | 0.4 | 0.5 | 0.5 | 1.3 | — |
| | | Not Smaller Than 0.5 μm | number/g | 6,100 | 8,300 | 8,100 | 8,200 | 7,200 | 7,400 | 6,900 | 8,200 | 21,200 | — |

Ex.: Example, C.Ex.: Comparative Example

<Production of CD Disk>

A mold specifically used for CD was attached to the injection molding machine DISK3 M III of Sumitomo Heavy Industries, Ltd., and a CD stamper made of nickel and having pits was attached to the mold. The molding pellets shown in Tables 2 and 3 as molding materials were fed into the hopper of the molding machine through automated conveyance and molded into substrates each having a diameter of 120 mm and a thickness of 1.2 mm at a cylinder temperature of 340° C., a mold temperature of 75° C., an injection speed of 100 mm/sec and a holding pressure of 3,920 kPa, and CD disks were obtained from the substrates. The results of evaluating these CD disks are shown in Table 4.

TABLE 4

| Molding Pellets | Ex. 1 Ex. A | Ex. 2 Ex. B | Ex. 3 Ex. C | Ex. 4 Ex. D | Ex. 5 Ex. E | Ex. 6 Ex. F | Ex. 7 Ex. G | Ex. 8 Ex. H | Ex. 9 Ex. I | Ex. 10 Ex. J | Ex. 11 Ex. K |
|---|---|---|---|---|---|---|---|---|---|---|---|
| Color Non-uniformity | ○ | ○ | ○ | ○ | ○ | ○ | ○ | ○ | ○ | ○ | ○ |
| Color Streaks | ○ | ○ | ○ | ○ | ○ | ○ | ○ | ○ | ○ | ○ | ○ |
| Appearance | Black | Black | Black | Red | Red | Red | Yellow | Yellow | Blue | Vivid Red | Vivid Yellow |
| C1AVE | 0.56 | 0.57 | 0.56 | 0.51 | 0.5 | 0.5 | 0.61 | 0.51 | 0.58 | 0.65 | 0.62 |
| White Defects | 0.4 | 0.4 | 0.4 | 0.3 | 0.3 | 0.3 | 0.3 | 0.3 | 0.3 | 0.3 | 0.2 |

| Molding Pellets | Ex. 12 Ex. L | Ex. 13 Ex. M | Ex. 14 Ex. N | Ex. 15 Ex. O | Ex. 16 Ex. P | Ex. 17 Ex. Q | Ex. 18 Ex. R | C. Ex. 1 C. Ex. A | C. Ex. 2 C. Ex. B |
|---|---|---|---|---|---|---|---|---|---|
| Color Non-uniformity | ○ | ○ | ○ | ○ | ○ | ○ | ○ | X | — |
| Color Streaks | ○ | ○ | ○ | ○ | ○ | ○ | ○ | Δ | — |
| Appearance | Black | Black | Black | Red | Yellow | Blue | Black | Blue | Transparent |
| C1AVE | 0.61 | 0.56 | 0.58 | 0.5 | 0.4 | 0.55 | 0.51 | 4.96 | — |
| White Defects | 0.4 | 0.4 | 0.4 | 0.4 | 0.3 | 0.4 | 0.5 | 1.2 | — |

Ex.: Example, C. Ex: Comparative Example

<Production of CD-R Disk>

The molding pellets shown in Table 2 were molded into disk substrates, and a dye-contained recording layer was formed each of the substrates to prepare CD-R disks. The results of evaluating these CD-R disks are shown in Table 5.

TABLE 5

| Molding Pellets | Ex. 19 Ex. A | Ex. 20 Ex. E | Ex. 21 Ex. H | Ex. 22 Ex. I | Ex. 23 Ex. J | C. Ex. 3 C.Ex. B |
|---|---|---|---|---|---|---|
| Color Non-uniformity | ◯ | ◯ | ◯ | ◯ | ◯ | — |
| Color Streaks | ◯ | ◯ | ◯ | ◯ | ◯ | — |
| Appearance | Black | Red | Yellow | Blue | Vivid Red | Transparent |

Ex.: Example, C. Ex: Comparative Example

Further, a weatherability test in which the recording surfaces of the CD-R disks were exposed to sunlight through glass to check the number of passed days until a problem occurs in writing data on and reading data from the CD-R disks, is carried on. As a result, Examples had more than twice as much weatherability as Comparative Examples.
<Production of DVD Disk>

A mold specifically used for DVD was attached to the injection molding machine DISK3 M III of Sumitomo Heavy Industries, Ltd., and a DVD stamper made of nickel and having the information on address signals and the like was attached to the mold. The molding pellets shown in Tables 2 and 3 as molding materials were fed into the hopper of the molding machine through automated conveyance and molded into DVD substrates each having a diameter of 120 mm and a thickness of 0.6 mm at a cylinder temperature of 380° C., a mold temperature of 115° C., an injection speed of 300 mm/sec and a holding pressure of 3,920 kPa, and DVD disks were obtained from the substrates. The results of evaluating these DVD disks are shown in Table 6.

TABLE 6

| Molding Pellets | | Ex. 24 Ex. J | Ex. 25 Ex. K |
|---|---|---|---|
| Color Non-uniformity | | ◯ | ◯ |
| Color Streaks | | ◯ | ◯ |
| Transmittance (%) | Largest Transmittance at 350 to 400 nm | 60 | 64 |
| | Smallest Transmittance at 400 to 650 nm | 10 | 7 |
| | Transmittance at 650 nm | 90 | 90 |
| Lamination of DVD | | ◯ | ◯ |

Ex.: Example

What is claimed is:

1. Coloring master pellets for an optical molded article which are formed from a coloring composition comprising a transparent thermoplastic resin (component A) containing a colorant (component B), wherein the proportion of pellets having colorant concentrations which satisfy a range of 0.5X to 1.5X, when the concentrations of the colorants in the pellets are indicated in terms of absorbance and the average concentration is expressed as X, is at least 90%.

2. The coloring master pellets of claim 1, wherein each pellet has a length of 2.0 to 3.3 mm and a long diameter in the cross section of 2.5 to 3.5 mm.

3. The coloring master pellets of claim 1, wherein the proportion of pellets having colorant concentrations which satisfy a range of 0.6X to 1.3X, when the concentrations of the colorants in the pellets are indicated in terms of absorbance and the average concentration is expressed as X, is at least 90%.

4. The coloring master pellets of claim 1, wherein the proportion of pellets having colorant concentrations which satisfy a range of 0.5X to 1.5X, when the concentrations of the colorants in the pellets are indicated in terms of absorbance and the average concentration is expressed as X, is at least 95%.

5. The coloring master pellets of claim 1, wherein the content of powders formed from the coloring composition and having a particle diameter of not larger than 1.0 mm is not higher than 250 ppm.

6. The coloring master pellets of claim 1, wherein the content of powders formed from the coloring composition and having a particle diameter of not larger than 2.0 mm is not higher than 5 wt %.

7. The coloring master pellets of claim 1, wherein the number of foreign materials having a particle diameter of not smaller than 200 μm is one or less per kg of the pellets.

8. The coloring master pellets of claim 1, wherein the transparent thermoplastic resin (component A) is an aromatic polycarbonate resin having a viscosity average molecular weight of 10,000 to 22,000.

9. The coloring master pellets of claim 1, wherein the content of the colorant (component B) in the coloring composition is 0.005 to 10 wt %.

10. The coloring master pellets of claim 1, wherein the colorant (component B) is an anthraquinone-based dye, a perinone-based dye, a quinoline-based dye, a perylene-based dye, a coumarin-based dye or a thioindigo-based dye.

11. An optical resin molding material comprising 3 to 50 wt % of the coloring master pellets of claim 1 and 97 to 50 wt % of pellets formed from the transparent thermoplastic resin.

12. A colored optical disk formed from the molding material of claim 11.

13. A colored CD-R or DVD-R formed from the molding material of claim 11.

14. The yellow-colored master pellets of claim 1, wherein the colorant is selected from the group consisting of CI Solvent Yellow 33, CI Solvent Yellow 157, CI Solvent Yellow 98, CI Disperse Yellow 54, CI Disperse Yellow 160, CI Vat Yellow 4, CI Solvent Yellow 160:1 and F Yellow 083 of LUMOGEN series manufactured by BASF Ltd.

15. The blue-colored master pellets of claim 1, wherein the colorant is selected from the group consisting of CI Solvent Blue 87, CI Solvent Blue 94, CI Solvent Blue 97, CI Solvent Violet 13, CI Solvent Violet 14 and CI Disperse Violet 28.

16. The red-colored master pellets of claim 1, wherein the colorant is selected from the group consisting of CI Solvent Red 22, CI Solvent Red 52, CI Solvent Red 149, CI Solvent Red 150, CI Solvent Red 151, CI Solvent Red 168, CI Solvent Red 191, CI Solvent Red 207, CI Solvent Red 135, CI Solvent Red 179, CI Vat Red 2, CI Vat Red 41, CI Vat Red 47, CI Solvent Orange 55, CI Solvent Orange 60, CI Solvent Orange 63, CI Vat Orange 1, CI Vat Orange 2, CI Vat Orange 4, CI Vat Orange 9, MACROLEX Fluorescent Red G manufactured by Bayer, AG and F Red 305, F Red 339 and F Orange 240 of LUMOGEN series manufactured by BASF Ltd.

17. The green-colored master pellets of claim 1, wherein the colorant is selected from the group consisting of CI Solvent Green 3, CI Solvent Green 20 and CI Solvent Green 28.

18. The black-colored master pellets of claim 1, wherein the colorant comprises (i) a green dye selected from the group consisting of CI Solvent Green 3, CI Solvent Green 20 and CI Solvent Green 28 and (ii) a red dye selected from the group consisting of CI Solvent Red 22, CI Solvent Red 52, CI Solvent Red 151, CI Solvent Red 168, CI Solvent Red 191, CI Solvent Red 207, CI Solvent Red 135, CI Solvent Red 179 and CI Solvent Orange 60.

19. The black-colored master pellets of claim 1, wherein the colorant comprises (i) a blue dye selected from the group consisting of CI Solvent Blue 87, CI Solvent Blue 94, CI Solvent Blue 97, CI Solvent Violet 13, CI Solvent Violet 14 and CI Disperse Violet 28 and (ii) a yellow dye selected from the group consisting of CI Solvent Yellow 33, CI Solvent Yellow 157, CI Solvent Yellow 98, CI Disperse Yellow 54 and CI Disperse Yellow 160.

20. Coloring master pellets for an optical molded article which are formed from a coloring composition comprising an aromatic polycarbonate resin containing a colorant, wherein
  (1) the proportion of pellets having colorant concentrations which satisfy a range of 0.5X to 1.5X, when the concentrations of the colorants in the pellets are indicated in terms of absorbance and the average concentration is expressed as X, is at least 90%,
  (2) the pellets each have a length of 2.0 to 3.3 mm and a long diameter in the cross section of 2.5 to 3.5 mm,
  (3) the number of foreign materials having a particle diameter of not smaller than 200 μm is one or less per kg of the pellets, and,
  (4) the content of powders formed from the coloring composition and having a particle diameter of not larger than 1.0 mm is not higher than 250 ppm.

21. A method for producing coloring master pellets for an optical molded article which comprises the steps of:
  (1) mixing colorant powders and aromatic polycarbonate resin powders together uniformly to prepare a powdery coloring master composition,
  (2) mixing the coloring master composition with aromatic polycarbonate resin powders or pellets such that the content of the colorant in the obtained mixture should be 0.005 to 10 wt %, and
  (3) melt-kneading the obtained composition to pelletize it, wherein the proportion of pellets having colorant concentrations which satisfy a range of 0.5X to 1.5X when the concentrations of the colorants in the pellets are indicated in terms of absorbance and the average concentration is expressed as X is at least 90%.

22. The method of claim 21, wherein the aromatic polycarbonate resin powders have an average particle diameter of 0.10 to 0.55 mm.

23. Coloring pellets for an optical molded article which are formed from a coloring composition comprising a transparent thermoplastic resin (component A) containing a colorant (component B), wherein the proportion of pellets having colorant concentrations which satisfy a range of 0.5X to 1.5X when the concentrations of the colorants (component B) in the pellets are indicated in terms of absorbance and the average concentration is expressed as X is at least 90%.

24. An optical disk formed from the coloring pellets of claim 23.

25. A colored CD-R or colored DVD-R formed from the coloring pellets of claim 23.

* * * * *